United States Patent Office
3,355,462
Patented Nov. 28, 1967

3,355,462
NORBORNENE LACTONES AND THEIR
PREPARATION
Yves Colleuille and Philippe Perras, Lyon, France, assignors to Rhone-Poulenc S.A., Paris, France, a French corporation
No Drawing. Filed Oct. 23, 1963, Ser. No. 318,176
Claims priority, application France, Oct. 25, 1962, 913,406; Sept. 24, 1963, 948,508
9 Claims. (Cl. 260—343.3)

ABSTRACT OF THE DISCLOSURE

The invention provides new polycyclic lactones, useful as insecticides, obtained by the reaction of norbornene or a substituted derivative thereof with an ethylenically unsaturated compound in the presence of carbon monoxide and a cobalt carbonyl catalyst.

---

The present invention relates to polycyclic lactones derived from 2-norbornene.

It is known that it is possible to obtain ethylenic dilactones by reacting acetylenic compounds with carbon monoxide under a pressure of at least 50 atmospheres, the operation being carried out in an inert organic medium and in the presence of a catalyst based on cobalt carbonyl (French Patent No. 1,179,218, and French patent of Addition No. 73,329).

It is also known to react carbon monoxide with aliphatic or alicyclic ethylenic hydrocarbons in the presence of various compounds such as water, ammonia, and alcohols, but in such cases not lactones but acids or acid anhydrides, esters and amides are obtained [Willemart, Bull. Soc. Chim. p. 157 (1947)].

It has now been found that, by reacting carbon monoxide under pressure in the presence of a cobalt carbonyl catalyst with a mixture consisting of 2-norbornene or a substituted derivative thereof containing the ring

and an ethylenically unsaturated aliphatic, cycloaliphatic or polycyclic compound containing a —CH=C< group which compound may be substituted, new polycyclic monolactones having valuable insecticidal properties are obtained in good yield.

Accordingly the present invention provides, as new compounds, polycyclic lactones of the formula:

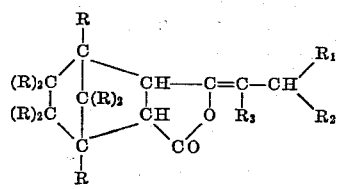

in which R represents a hydrogen or halogen atom or an alkyl, substituted alkyl, carboxyl, alkoxycarbonyl, alkanoyl, alkanoyloxy, alkanoyloxyalkyl, hydroxy, alkoxy, aryloxy, aralkyloxy or cycloalkoxy radical or together with an adjacent R may represent a ring structure, $R_1$ represents a hydrogen atom, a functional group, an alkyl radical or alkyl radical substituted by a functional group, and $R_2$ and $R_3$, which are the same or different, either represent hydrogen atoms or alkyl radicals, or together form a divalent hydrocarbon chain or a divalent radical having a mono-or polycyclic structure.

The invention also comprises a process for the preparation of such compounds in which carbon monoxide is reacted under pressure and in the presence of a cobalt carbonyl catalyst with a mixture comprising compounds of the formula:

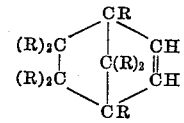

and

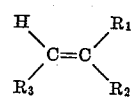

R, $R_1$, $R_2$ and $R_3$ being as defined above.

The reaction giving rise to these new compounds may be schematically represented by the following diagram (A):

(A)
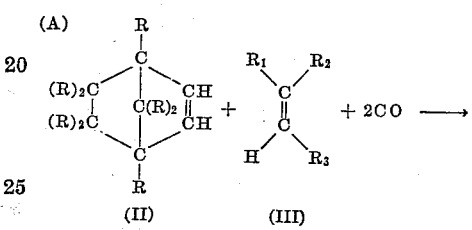

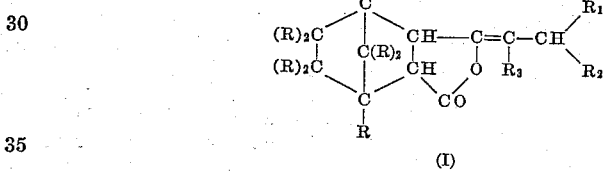

in which II is 2-norbornene or a derivative thereof and III is an ethylenically unsaturated aliphatic, cycloaliphatic or polycyclic compound, the symbols R, $R_1$, $R_2$ and $R_3$ being as hereinbefore defined.

Where the compound III is a polycyclic compound of the 2-norbornene type, the reaction may be schematically represented by the following diagram (B):

(B)
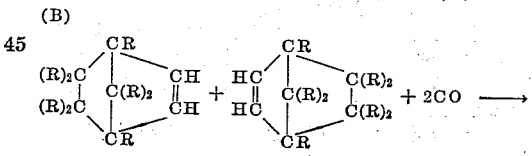

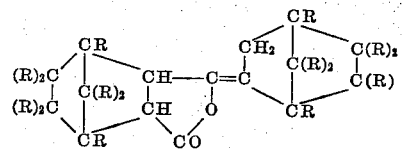

the symbols R being as hereinbefore defined.

The reaction diagrams (A) and (B) are given by way of illustration, but it should understood that if the molecule of compound III is asymmetric with $R_1$ representing a hydrogen atom, there may be two concurrent reactions, which follow diagram (A), but in which the addition takes place at opposite ends of the double bond in compound III, thus leading to a mixture of isomeric γ-lactones. Moreover, when compounds II and III are different and are capable of reacting separately with carbon monoxide in accordance with diagram (B), the action of carbon monoxide on such mixtures leads to mixtures, in variable proportions, of lactones formed respectively from a molecule of product II and a molecule of product III, from two molecules of product II, and from two molecules of product III. The constituents of the mixtures thus obtained may be separated by any appropriate method, the most convenient one being fractional distillation. Finally, cis-trans isomers are also possible when the groups —R₃ and —CHR₁R₂ in compound III are different.

The compounds of Formula II may be obtained by a Diels-Alder reaction between a cyclopentadiene compound and an ethylenic compound [Organic Syntheses, vol. 37, p. 65 (1957); J. A. Norton, Chem. Rev. 31, 320–523 (1942) and J. G. Martin, Chem. Rev. 61, 537–562 (1961)]. Compound II may be 2-norbornene itself or a substituted derivative thereof such as dicyclopentadiene, 1-methyl-2-norbornene, 5-acetoxymethyl-2-norbornene, 5-methoxycarbonyl-2-norbornene or 5,6-diethoxycarbonyl-2-norbornene.

As examples of the ethylenic compounds of Formula III, there may be mentioned the straight or branched-chain olefins such as ethylene, propylene, butylene, isobutylene, pent-1-ene, isopentene and their higher homologues, the cycloolefins such as cyclobutene, cyclopentene, cyclohexene, optionally substituted by alkyl groups, and their higher homologues, 2-norbornene itself and substituted derivatives thereof such as those mentioned above, the ethylenic nitriles such as acrylonitrile, crotonitrile, methacrylonitrile, the ethylenic acids and their esters such as acrylic, methacrylic, crotonic, tiglic, angelic, senecioic, undec-10-enoic acids, the ethylenic aldehydes such as acrolein, methacrolein, and crotonaldehyde, the ethylene alcohols such as allyl alcohol and undecylene alcohol, the vinyl and allyl ethers, and the vinyl and allyl esters.

The foregoing compounds of Formulas II and III are given merely by way of example and many other similar compounds may be used.

When carbon monoxide is reacted with a compound of Formula II in the presence of an ethylenic compound of Formula III which does not conform to Formula II, there is preferably employed a molecular excess of the compound of Formula III over the compound of Formula II. In general, a large excess of the ethylenic compound of Formula III is employed, for example of the order of 2 to 10 moles per mole of compound of Formula II.

The reaction may be carried out under carbon monoxide pressures of the order of 50 to 500 atmospheres and at temperatures from 80° C. to 200° C., the heating being maintained until the pressure remains constant in the reaction vessel. Pressures above 100 atmospheres, preferably from 100 to 300 atmospheres, and temperatures of the order of 100° C. to 150° C. are particularly advantageous.

As is usual in carbonylation reactions, the operation is carried out in the presence of an organic solvent which is inert under the operating conditions and of a catalyst based upon cobalt carbonyl.

Suitable solvents are aromatic or saturated aliphatic or alicyclic hydrocarbons, more especially the benzene hydrocarbons. There may be mentioned, for example, heptane, cyclohexane and toluene.

In the operation of the present process, the appropriate quantities of suitable compounds of Formulae II and III are charged into an autoclave with an inert organic liquid and a catalytic quantity of cobalt carbonyl. When the compound of Formula III is gaseous at atmospheric pressure, the compound of Formula II, the diluent and the catalyst are first charged, the autoclave is closed and then the compound of Formula III is charged under pressure. Finally, carbon monoxide is charged under sufficient pressure to provide a large excess thereof. The mixture is heated with stirring and heating until the pressure at constant temperature does not vary. After cooling and degassing the autoclave, the catalyst is eliminated from the reaction mass by washing with a dilute mineral acid and then with distilled water, and the remaining constituents of the mixture obtained are separated by distillation.

The lactones obtained may be converted by saponification by known methods into corresponding ketonic acids, which are also novel products and are generally obtained in crystalline form.

These ketonic acids may be represented by the following general formula:

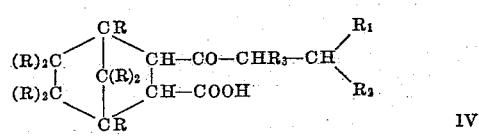

IV in which R, R₁, R₂ and R₃ are as hereinbefore defined.

The new lactones are useful as insecticides. The invention accordingly includes within its scope insecticidal compositions comprising one or more of the new lactones in association with an inert carrier. The corresponding ketonic acids are, by virtue of the presence of a carboxyl grouping in their molecule, intermediate products which are suitable for use, for example, in the preparation of polyester resins.

The invention is illustrated by the following examples.

*Example 1*

564 g. of 2-norbornene (6 moles), 300 cc. of cyclohexane and 200 cc. of a solution of dicobalt octacarbonyl in cyclohexane, containing 5 g. of cobalt to 100 cc. are charged into a 5-litre autoclave which is closed and successively flushed with nitrogen and with carbon monoxide.

Carbon monoxide is then introduced until a pressure of 100 kg./cm.² is reached, and the mixture is heated with stirring. After heating for 1 hour, the temperature reaches 110° C. and the pressure of 132 kg./cm.². A pressure drop is observed and at the same time the temperature rises to 117° C. due to the exothermic nature of the reaction. The temperature is maintained at 110° C. for 9 hours, after which the autoclave is cooled to normal temperature, the pressure then being 77 kg./cm.².

After degassing, the crude product is withdrawn from the autoclave and is washed with 2×750 cc. of N/2 nitric acid at 80° C. to remove the catalyst, and then with 2×1000 cc. of distilled water. On distillation of the resultant organic liquid the first fraction is the cyclohexane solvent and unreacted 2-norborne (7 g.), after which there is obtained a small fraction of norbornylmethanal (12 g.) boiling at 45–47° C. under 0.5 mm. Hg, and then 640 g. of a middle fraction which passes over at 160° C. under a pressure of 0.5 mm. Hg. The residue is 20 g.

The middle fraction is a colourless liquid having a strong odour, a refractive index of $n_D^{20}=1.5448$, a bromine number of 66.2, a molecular weight of 244 and the empirical formula $C_{16}H_{20}O_2$. The infra-red and paramagnetic nuclear resonance spectra show that it is a γ-lactone of the following formula:

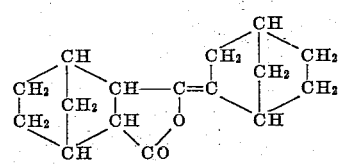

This compound will be referred to hereinafter simply as the $C_{16}$ lactone. The percentage of 2-norbornene reacted is 98.8% and yield of the lactone $C_{16}H_{20}O_2$ is 89.5%.

By saponification of this lactone with aqueous 1.5 N sodium hydroxide solution, followed by the addition of hydrochloric acid until the pH is below 7, there is obtained a white precipitate which, when recrystallised from a 50/50 mixture of diethyl ether and petroleum ether, melts at 135–136° C. The product analyses 98.2% of acid and its empirical formula is $C_{16}H_{22}O_3$ (molecular weight 262). The infra-red spectrum shows that it is in fact a ketonic acid of the following formula:

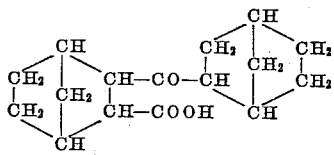

Example 2

200 g. of 2-norbornene (2.125 moles), 200 cc. of cyclohexane and 120 cc. of a solution of dicobalt octacarbonyl in cyclohexane, containing 5 g. of cobalt per 100 cc. are charged into a 5-litre autoclave, which is closed and flushed with nitrogen and with carbon monoxide. A pressure of 40 kg./cm.$^2$ is then set up with ethylene, and this pressure is then raised to 130 kg./cm.$^2$ with carbon monoxide. The procedure of Example 1 is then followed, and the reaction is allowed to proceed for 7 hours at 110° C. The maximum pressure observed is 180 kg./cm.$^2$ and the pressure drop at 25° C. is 13 kg./cm.$^2$.

After the crude product withdrawn from the autoclave has been washed and distilled in vacuo, as in Example 1, there are obtained:

69 g. of $C_{16}$ lactone identical to that of Example 1; and 129 g. of a colourless liquid having a strong odour and boiling at 97–98° C. under 0.8 mm. Hg, of which the refractive index is $n_D^{20}=1.5128$, and the bromine number 86.4.

Analysis of this product by the methods used in Example 1 for the $C_{16}$ lactone shows that it is a γ-lactone of the empirical formula $C_{11}H_{14}O_2$ (molecular weight 178), of the following structural formula:

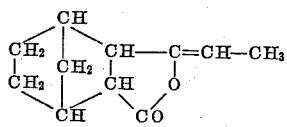

This compound will be referred to hereinafter as the $C_{11}$ lactone.

The percentage of 2-norbornene reacted is 90% and the yields of the lactones are as follows: $C_{16}$ lactone 26.6%; $C_{11}$ lactone 34%.

This $C_{11}$ lactone gives, on saponification as described in Example I, a ketonic acid melting at 108–109° C., of the following structural formula:

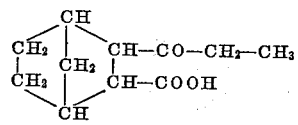

Example 3

40 g. of 2-norbornene (0.425 mole), 60 cc. of cyclohexane and 30 cc. of a solution of dicobalt octacarbonyl in cyclohexane, containing 5 g. of cobalt to 100 cc., are charged into a 500 cc. autoclave. After flushing the autoclave with nitrogen and with carbon monoxide, a pressure of 13 kg./cm.$^2$ is set up with propylene (which corresponds to 81 g., i.e. 1.9 mole), and then the pressure is raised to 100 kg./cm.$^2$ with carbon monoxide. The autoclave is maintained at 100° C. for 7½ hours with stirring.

After treatment of the reaction mass as in Example 1, there are obtained by distillation in vacuo:

7 g. of $C_{16}$ lactone identical to that described in Example 1; and 52 g. of colourless liquid boiling at 112–113° C. under 0.8 mm. Hg, having a refractive index of $n_D^{20}=1.5097$, and a bromine number of 78.5.

Analysis of the product identifies it as a mixture of $C_{12}$ gamma-lactones having the following formulae:

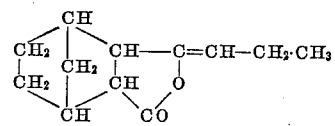

and

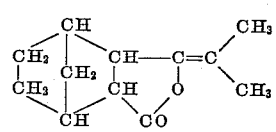

The percentage of the 2-norbornene that has reacted is 98.8%, the yield of $C_{16}$ lactone is 7% and of $C_{12}$ lactone 64%.

The mixture of the $C_{12}$ lactones gives on saponification a mixture of ketonic acids melting at 66–67° C. and having the following formulae:

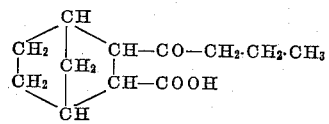

and

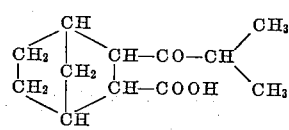

Example 4

The procedure of Example 3 is followed, propylene being replaced by isobutylene, using the following pressures and proportions of reactants: 2-norbornene, 35 g. (0.372 mole); cyclohexane, 60 cc.; catalyst solution, 30 cc.; isobutylene pressure, 2 kg./cm.$^2$ (which corresponds to about 56 g., i.e. 1 mole); and carbon monoxide pressure, raised from 98 kg./cm.$^2$ in addition to the isobutylene pressure.

There are finally obtained after distillation in vacuo:

17.6 g. of $C_{16}$ lactone; and 18.7 g. of a colourless liquid boiling at 128–130° C. under 1 mm. Hg, having a refractive index of $n_D^{20}=1.5018$, and a bromine number of 71.7, identified as a $C_{13}$ gamma-lactone, and corresponding to the following formula:

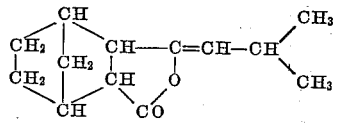

The yield of $C_{16}$ lactone is 39% and of the $C_{13}$ lactone 24.5%, with a percentage of 2-norbornene conversion of 91.5%.

The $C_{13}$ lactone may be converted by saponification into a ketonic acid melting at 81.5–82.5° C., of the following formula:

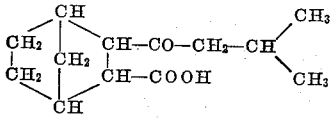

Example 5

By reacting 35 g. (i.e. 0.372 mole) of 2-norbornene and 180 g. (i.e. 1.22 mole) of cyclohexene under the conditions described in Example 3, there is obtained a mixture of two lactones: a $C_{16}$ lactone identical to that described in Example 1, and a $C_{15}$ lactone of the following formula:

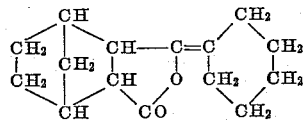

On saponification of the mixture of these two lactones, there are obtained the ketonic acid, M.P. 135–136° C. described in Example 1, and a ketonic acid corresponding to the $C_{15}$ lactone. This acid melts at 124–125° C.

The two ketonic acids may be separated by fractional recrystallisation from a 50/50 mixture of diethyl ether and petroleum ether.

*Example 6*

35 g. of 1-methyl-2-norbornene, 60 cc. of cyclohexane and 25 cc. of a solution of dicobalt octacarbonyl in cyclohexane, containing 4 g. of cobalt to 100 cc., are charged into a 500 cc. autoclave. A pressure of 100 atmospheres is produced by introducing carbon monoxide and the mixture is then heated to 145° C. for 7 hours, the maximum pressure reaching 149 atmospheres. The autoclave is then cooled to normal temperature, degassed and flushed with nitrogen, and the resultant product treated by heating at its boiling point (80° C.) with 300 cc. of 2 N nitric acid to eliminate the cobalt, this operation being repeated three times. The organic layer is finally washed with 3× 300 cc. of distilled water. On distillation, the cyclohexane is the first distillate, followed by traces of 1-methyl-2-norbornene and 1-methylformyl(2 or 3)-2-norbornene, and there are then obtained 36 g. of a very viscous, slightly yellowish liquid boiling at 150–160° C. under 0.7 mm. Hg, which is shown by infra-red analysis and the nuclear magnetic resonance to have the following formula:

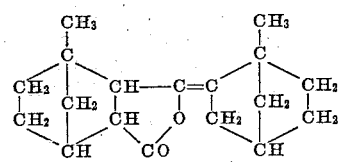

This product is 99.7% pure, based on the lactone function. The yield is therefore 81.5% based upon the 1-methyl-2-norbornene. On saponification of this lactone with aqueous 1.5 N sodium hydroxide solution, followed by acidification with hydrochloric acid until the pH is below 7, there is obtained a crystalline ketonic acid, of the following formula:

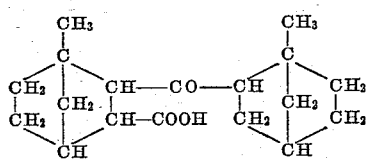

which melts at 108–109° C. after recrystallisation from a mixture of ethyl acetate and petroleum ether (yield of pure product, 78% based on the lactone).

The 1-methyl-2-norbornene employed is prepared by Diels-Alder reaction between ethylene and a mixture of 1-methyl- and 2-methyl-1,3-cyclopentadiene, followed by separation by distillation at 105–106° C. under 760 mm. Hg.

*Example 7*

The procedure of Example 6 is followed, but 1-methyl-2-norbornene is replaced by 70 g. of dicyclopentadiene and the mixture is heated for 7 hours at a temperature maintained between 130° and 170° C., the maximum pressure reaching 140 atmospheres. After cooling, a pressure drop of 10 atmospheres is noted (pressure in the apparatus 90 atmospheres instead of 100 atmospheres at the start). After purification, as indicated in Example 6, there are obtained 7.5 g. of a vitreous product boiling at 190–197° C. under 0.18 mm. Hg, of the following formula:

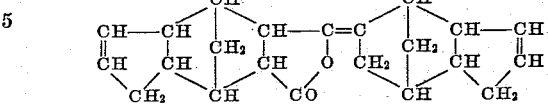

Determination of the lactone function indicates a purity of 100%, and therefore a yield of 9% based on the dicyclopentadiene.

*Example 8*

The procedure of Example 6 is followed, but 1-methyl-2-norbornene is replaced by 50 g. of dicyclopentadiene and 51 g. of ethylene (at 44 atmospheres), the operation being carried out under a partial pressure of carbon monoxide of only 81 atmospheres. The mixture is heated for 6 hours at a temperature between 115° and 130° C. The maximum pressure reaches 238 atmospheres and the pressure drop between the initial and final pressures in the autoclave (measured at room temperature) is 16 atmospheres.

After purification as previously described, 11 g. are obtained of a very viscous liquid boiling at 128–138° C. under 0.4 mm. Hg, of the following formula:

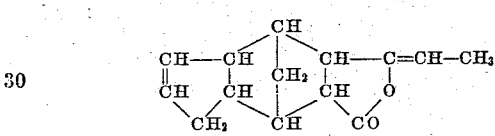

Determination of the lactone function indicates a purity of 100%, and therefore a yield of 14% based on the dicyclopentadiene.

*Example 9*

The procedure of Example 6 is followed, except that 1-methyl-2-norbornene is replaced by 40 g. of 5-acetoxymethyl-2-norbornene and 40 g. of ethylene (i.e. 38 atmospheres), and the operation is carried out under a partial pressure of carbon monoxide of only 90 atmospheres. The mixture is heated for 9 hours at 135° C., the maximum pressure reaches 206 atmospheres and the pressure drop at the end of the reaction is 26 atmospheres. After purification, as described in the preceding examples, distillation yields 19 g. of unreacted 5-acetoxymethyl-2-norbornene and 15 g. of a product boiling at 158–162° C. under 0.1 mm. Hg. Determination of the lactone and ester functions shows this product to consist of 97% of a compound of the formula:

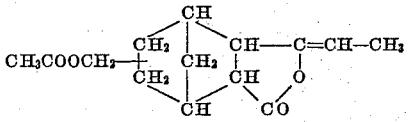

The yield is 47% based on the 5-acetoxymethyl-2-norbornene (percentage conversion 53.5%).

The 5-acetoxymethyl-2-norbornene employed as the starting material is obtained in a yield of 95% by the reaction of acetyl chloride with 5-hydroxymethyl-2-norbornene obtained in accordance with the procedure of K. Adler and E. Windemuth, Ber. 71B, 1939–1957 (1938).

*Example 10*

The procedure of Example 6 is followed, except that the 1-methyl-2-norbornene is replaced by 35 g. of 5-methoxycarbonyl-2-norbornene [prepared in accordance with the procedure of A. C. Cope et al., J. Amer. Chem. Soc. 81, 2802 (1959)], and heating is carried out for 8½ hours at 135° C. The maximum pressure observed is 144 atmospheres and the pressure drop is 7 atmospheres. After purification as described in the preceding examples, 36 g.

are obtained of a product boiling at 195–205° C. under 0.06 mm. Hg, having the following formula:

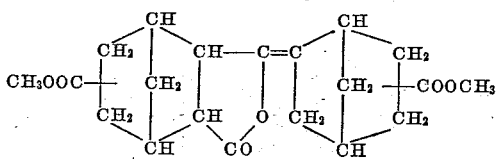

Determination of the lactone and ester functions shows the product to be 99% pure, and the yield to be 84% based on the 5-methoxycarbonyl-2-norbornene.

*Example 11*

The procedure of Example 6 is followed, except that 1-methyl-2-norbornene is replaced by 35 g. of 5,6-di-(ethoxycarbonyl)-2-norbornene, and heating is carried out for 12 hours at 145° C., during which the maximum pressure reaches 152 atmospheres. After purification, as described in the preceding examples, all the products boiling below 236° C. under 0.4 mm. Hg are driven off by distillation, leaving 36.5 g. of a brown residue of the following formula:

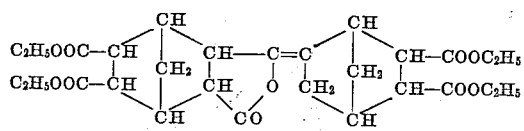

Determination of the lactone and ester functions shows this product to be 99.4% pure and the yield to be 92.8% based on the 5,6-di(ethoxycarbonyl)-2-norbornene.

The 5,6 - di(ethoxycarbonyl) - 2 - norbornene employed as starting material is obtained by Diels-Alder reaction between ethyl maleate and cyclopentadiene by the technique employed by K. Alder and G. Stein, Ann. 504, 242 (1933) for the preparation of the methyl diester.

*Example 12*

300 g. of 2-norbornene, 800 g. of ethyl acrylate and 150 cc. of a solution of dicobalt octacarbonyl in cyclohexane, containing 4 g. of cobalt to 100 cc. of solution, are charged into a 5 litre autoclave. Carbon monoxide is introduced to a pressure of 100 atmospheres, after which heating is carried out for 12 hours at 135° C. The maximum pressure observed is 135 atmospheres and the pressure drop, measured at 25° C. at the end of the reaction, is 26 atmospheres.

After treatment with N/2 nitric acid, washing with distilled water and distillation, there are obtained 486 g. of product boiling at 156–163° C. under 0.4 mm. Hg. On purification this product gives 269 g. of product boiling at 153–154° C. under 0.4 mm. Hg, which contains 94% of a compound of the following formula:

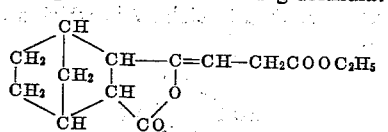

By saponification of 250 g. of this lactone and recrystallisation from a mixture of petroleum ether and ethyl acetate of the diacid obtained there are obtained 109 g. of a crystalline ketonic diacid which melts at 133.3–133.5° C., and which has the following formula:

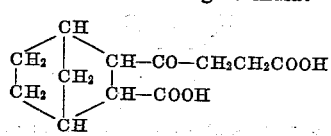

This diacid is obtained in a yield of 41% based on the lactone.

*Example 13*

36 g. of 2-norbornene, 90 g. of acrylonitrile, 20 cc. of a solution of dicobalt octacarbonyl in cyclohexane, containing 4 g. of cobalt per 100 cc., are charged into a 500 cc. autoclave and carbon monoxide is introduced to a pressure of 100 atmospheres. The mixture is heated for 7 hours at a temperature between 120° and 130° C. The maximum pressure reaches 136 atmospheres and the pressure drop, measured at the end of the reaction, is 38 atmospheres. After purification as described in the preceding examples, distillation and rectification, 11 g. of a viscous liquid boiling at 146.5–148° C. under 0.4 mm. Hg are obtained (yield 17% based on the 2-norbornene), having the formula:

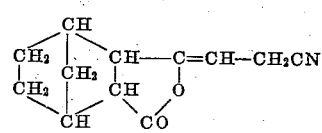

The infra-red spectrum confirms the presence of the double ethylenic bond and of the lactone and nitrile functions.

*Example 14*

30 g. of 2-norbornene, 126 g. of methyl undec-10-enoate, 25 cc. of dicobalt octacarbonyl solution in cyclohexane, containing 4 g. of cobalt per 100 cc., are introduced into a 500 cc. autoclave and carbon monoxide introduced to a pressure of 110 atmospheres, after which the mixture is heated for 11½ hours at 140° C. The maximum pressure reached is 149 atmospheres and the pressure drop after the reaction, measured at 25° C., is 27 atmospheres. After purification there are recovered by distillation 85 g. of unconverted methyl undec-10-enoate, and the reaction product is then rectified. A considerable fraction of the product obtained consists of the $C_{16}$ lactone. In addition, there are obtained 43 g. of lactone boiling at 175–180° C. under 0.1 mm. Hg (yield 39% on the 2-norbornene), which is shown by infra-red spectrography and nuclear magnetic resonance to have the following formula:

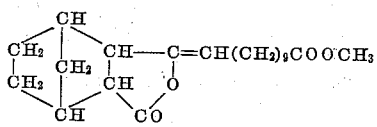

*Example 15*

38 g. of 5 - methoxycarbonyl - 2 - norbornene, 43 g. of methyl acrylate, 25 cc. of a solution of dicobalt octacarbonyl in cyclohexane, analysing 4 g. of cobalt per 100 cc., are introduced into a 500 cc. autoclave and carbon monoxide is introduced to a pressure of 100 atmospheres. Heating is carried out for 11 hours at 140° C. and the maximum pressure reaches 142 atmospheres. The product is purified by treatment with 2 N nitric acid, as previously indicated, distilled and rectified. There is thus isolated from the reaction product a fraction which is the lactone produced by reaction of carbon monoxide with 2 moles of 5 - methoxycarbonyl-2-norbornene, identical with that of Example 10, and 20 g. of product boiling at 180–183° C. under 0.5 mm. Hg. According to the determination of the lactone and ester groups, this product consists of 98.1% of a compound which, as shown by infra-red examination and the nuclear magnetic resonance, has the following structure:

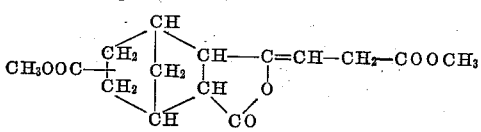

We claim:
1. A polycyclic lactone of the formula:

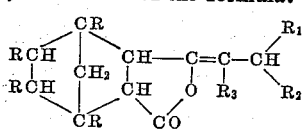

in which each R taken separately represents hydrogen, lower alkyl, carboxyl, lower alkoxy carbonyl, lower alkanoyl, lower alkanoyloxy, lower alkanoyloxy (lower alkyl), hydroxy, lower alkoxy, or phenoxy, the two R radicals attached to secondary carbon atoms also representing, when taken together, the radical

$R_1$ represents hydrogen, cyano, carboxyl, lower alkoxycarbonyl, lower alkyl, lower hydroxyalkyl, lower cyanoalkyl, lower carboxyalkyl, lower alkoxycarbonyl (lower alkyl), or aldehyde and $R_2$ and $R_3$ are the same or different and, when taken separately, are each hydrogen or lower alkyl, and, when taken together, are lower alkylene, lower alkyl-substituted lower alkylene, or a 1,3 - cyclopentylidene radical of formula:

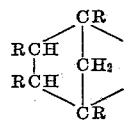

where R is as hereinbefore defined.

2. A polycyclic lactone according to claim 1 of the formula:

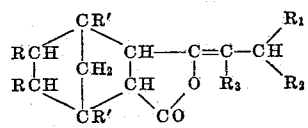

in which each R is hydrogen, acetoxymethyl, methoxycarbonyl or ethoxycarbonyl, or both R radicals together represent —CH$_2$CH=CH—, each R' is hydrogen or methyl, $R_1$ is hydrogen, cyano, carboxyl, methoxycarbonyl, ethoxycarbonyl, lower alkyl, 8 - (methoxycarbonyl)octyl, hydroxymethyl, 9 - hydroxy - nonyl, or aldehydo, and $R_2$ and $R_3$ when taken separately are each hydrogen or lower alkyl, and, when taken together, are lower alkylene, or a radical of formula:

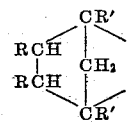

where R and R' are as hereinbefore defined.

3. A polycyclic lactone according to claim 2 of formula:

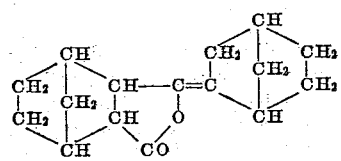

4. A polycyclic lactone according to claim 2 of formula:

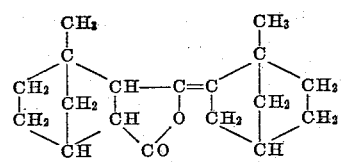

5. A polycyclic lactone according to claim 2 of formula:

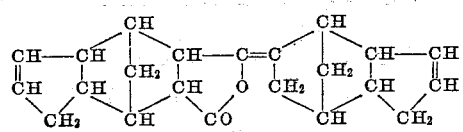

6. A polycyclic lactone according to claim 2 of formula:

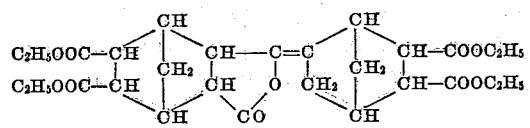

7. Process for the preparation of a polycyclic lactone which comprises reacting carbon monoxide at 80° to 200° C. under 50–500 atmospheres pressure and in the presence of a cobalt carbonyl catalyst with a mixture comprising compounds of the formula:

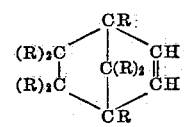

II and

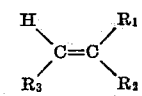

III in the ratio of 2 to 10 moles of the compound of Formula III per mole of the compound of Formula II, in which each R taken separately represents hydrogen, lower alkyl, carboxyl, lower alkoxycarbonyl, lower alkanoyl, lower alkanoyloxy, lower alkanoyloxy(lower alkyl), hydroxy, lower alkoxy, or phenoxy, the two R radicals attached to secondary carbon atoms also representing, when taken together, the radical —CH=CH—CH$_2$—, $R_1$ represents hydrogen, cyano, carboxyl, lower alkoxycarbonyl, lower alkyl, lower hydroxy-alkyl, lower cyanoalkyl, lower carboxyalkyl, lower alkoxycarbonyl (lower alkyl), or aldehyde and $R_2$ and $R_3$ are the same or different and, when taken separately, are each hydrogen or lower alkyl and, when taken together, are lower alkylene, lower alkyl-substituted lower alkylene, or a 1,3-cyclopentylidene radical of formula:

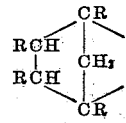

where R is as hereinbefore defined.

8. Process according to claim 7 in which a compound of formula:

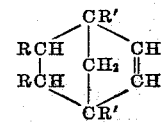

is reacted with a compound of formula:

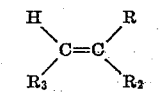

in which each R is hydrogen, acetoxymethyl, methoxycarbonyl or ethoxycarbonyl, or both R radicals together represent —CH$_2$CH=CH—, each R' is hydrogen or methyl, $R_1$ is hydrogen, cyano, carboxyl, methoxycarbonyl, ethoxycarbonyl, lower alkyl, 8-(methoxycarbonyl)octyl, hydroxymethyl, 9 - hydroxy - nonyl, or aldehydo, and $R_2$ and $R_3$ when taken separately are each hydrogen or lower alkyl, and, when taken together, are lower alkylene, or a radical of formula:

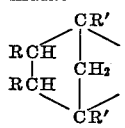

where R and R' are as hereinbefore defined.

9. Process according to claim 7, wherein the reaction is carried out under a carbon monoxide pressure of 100 to 300 atmospheres and at a temperature of 100° C. to 150° C.

References Cited
UNITED STATES PATENTS

| 2,861,082 | 11/1958 | Wheeler et al. | 260—343.3 |
| 2,891,248 | 6/1959 | Parchevsky et al. | 260—468 |
| 2,947,779 | 8/1960 | Idol | 260—486 |
| 2,957,008 | 10/1960 | Joly et al. | 260—343.3 |

JOHN D. RANDOLPH, *Primary Examiner.*

N. RIZZO, JAMES A. PATTEN, *Examiners.*